United States Patent
Hansson et al.

(10) Patent No.: US 9,581,051 B2
(45) Date of Patent: Feb. 28, 2017

(54) POWER GENERATION PLANT AND METHOD OF OPERATING A POWER GENERATION PLANT

(75) Inventors: Hans-Erik Hansson, Finspång (SE); Leif Nilsson, Norrköping (SE)

(73) Assignee: Euroturbine AB, Finspång (SE)

( * ) Notice: Subject to any disclaimer, the term of this patent is extended or adjusted under 35 U.S.C. 154(b) by 185 days.

(21) Appl. No.: 14/125,673

(22) PCT Filed: Jun. 13, 2012

(86) PCT No.: PCT/SE2012/050643
§ 371 (c)(1),
(2), (4) Date: Dec. 12, 2013

(87) PCT Pub. No.: WO2012/173560
PCT Pub. Date: Dec. 20, 2012

(65) Prior Publication Data
US 2014/0102099 A1     Apr. 17, 2014

(30) Foreign Application Priority Data
Jun. 13, 2011   (SE) ...................................... 1100454

(51) Int. Cl.
*F01K 23/10*    (2006.01)
*F03G 6/06*     (2006.01)
(Continued)

(52) U.S. Cl.
CPC ............ *F01K 23/10* (2013.01); *F01K 13/006* (2013.01); *F02C 1/05* (2013.01); *F02C 3/30* (2013.01);
(Continued)

(58) Field of Classification Search
CPC .......... F01K 23/10; F01K 13/006; F03G 6/06; F03G 6/02; F03G 6/064; F02C 1/05; F02C 3/30; F02C 6/18; Y02E 10/46
(Continued)

(56) References Cited

U.S. PATENT DOCUMENTS

| 6,279,312 B1 | 8/2001 | Hennecke |
| 6,367,257 B1 | 4/2002 | Witt et al. |

(Continued)

FOREIGN PATENT DOCUMENTS

| DE | 2945969 A1 | 5/1981 |
| DE | 196 52 349 A1 | 6/1998 |

(Continued)

OTHER PUBLICATIONS

PCT International Search Report; Application File Reference: 76205PC/RO; International Application No. PCT/SE2012/050643; International Filing Date: Jun. 13, 2012; Applicant: Euroturbine AB et al; Date of Actual Completion of International Search: Sep. 19, 2012; Date of Mailing of International Search Report: Sep. 20, 2012.

*Primary Examiner* — Hoang Nguyen
(74) *Attorney, Agent, or Firm* — Blank Rome LLP (57) ABSTRACT

A power generation plant including a solar radiation receiver for heating a medium stream and a turbine assembly being arranged to receive the heated medium stream from the solar radiation receiver, said turbine assembly being coupled to an electric power generator, wherein a combustor is positioned downstream of the solar radiation receiver and upstream of the turbine assembly, an air compressor unit having a compressed air outlet is arranged to supply compressed combustion air to the combustor, and a steam generator is arranged to extract heat from an outlet flow from the turbine assembly, and to produce steam to be transmitted to a medium stream inlet of the solar radiation receiver and (Continued)

subsequently to combustor. The invention also related to a method.

36 Claims, 10 Drawing Sheets

(51) Int. Cl.
  *F02C 1/05* (2006.01)
  *F02C 3/30* (2006.01)
  *F02C 6/18* (2006.01)
  *F01K 13/00* (2006.01)
  *F03G 6/02* (2006.01)

(52) U.S. Cl.
  CPC .................. *F02C 6/18* (2013.01); *F03G 6/02* (2013.01); *F03G 6/06* (2013.01); *F03G 6/064* (2013.01); *Y02E 10/46* (2013.01)

(58) Field of Classification Search
  USPC ................................ 60/39.182, 641.8–641.15
  See application file for complete search history.

(56) References Cited

U.S. PATENT DOCUMENTS

| | | | |
|---|---|---|---|
| 8,312,703 B2* | 11/2012 | Aoyama et al. | 60/39.182 |
| 8,327,641 B2* | 12/2012 | Freund et al. | 60/641.8 |
| 2002/0046561 A1* | 4/2002 | Bronicki et al. | 60/39.182 |
| 2004/0244376 A1 | 12/2004 | Litwin et al. | |
| 2008/0127647 A1 | 6/2008 | Leitner | |
| 2008/0302314 A1 | 12/2008 | Gonzalez et al. | |
| 2009/0193784 A1 | 8/2009 | Siden et al. | |
| 2011/0127773 A1 | 6/2011 | Freund et al. | |
| 2012/0102950 A1* | 5/2012 | Turchi | 60/641.15 |
| 2013/0229018 A1* | 9/2013 | Karni et al. | 290/1 R |

FOREIGN PATENT DOCUMENTS

| | | |
|---|---|---|
| GB | 2449181 A | 12/2008 |
| JP | 5-256166 A | 10/1993 |
| JP | 2000-213372 A | 8/2000 |
| JP | 2007-505261 A | 3/2007 |
| JP | 2009-180227 A | 8/2009 |
| JP | 2010275997 A | 12/2010 |
| JP | 2011-38412 A | 2/2011 |
| WO | WO 03/104629 A1 | 12/2003 |
| WO | WO 2005/028832 A1 | 3/2005 |

* cited by examiner

POWER GENERATION PLANT AND METHOD OF OPERATING A POWER GENERATION PLANT

CROSS-REFERENCES TO RELATED APPLICATIONS

This application is the national phase of International Application No. PCT/SE2012/050643 filed on Jun. 13, 2012, which claims the benefit of priority to Sweden Patent Application No. SE1100454-6 filed on Jun. 13, 2011. The entire disclosures thereof are incorporated herein by reference.

FIELD OF THE INVENTION

The invention concerns a power generation plant including a solar radiation receiver for heating a medium stream and a main turbine assembly being arranged to receive the heated medium stream from the solar radiation receiver, said main turbine assembly being coupled to an electric power generator, wherein the solar radiation receiver is arranged to be positioned at a first location and the main turbine assembly is arranged to be positioned at a second location, at a distance from the first location, and wherein a conduit is arranged for transmitting said heated medium stream from the solar radiation receiver to the main turbine assembly. The invention also concerns a method for operating a power generation plant.

BACKGROUND OF THE INVENTION

Power generation plants are previously known which include a number of solar radiation reflectors in turn being spread over a reception area, and a solar radiation receiver upon which reflected solar light is concentrated. In particular the solar radiation receiver comprises a steam generator for the production of steam to be passed on to a turbine which in turn drives an electric generator for the production of electrical energy.

The turbine and the associated generator are heavy and bulky and are thus positioned at a site where they are easily installed and accessible, whereas the solar radiation receiver preferably is positioned at a place having best reception conditions for the combined reflectors which most often is at a relatively elevated position. Steam from the solar radiation receiver is conducted over isolated conduits to the turbine and water to be inlet to the solar radiation receiver is correspondingly pumped back to the solar radiation receiver.

AIM AND MOST IMPORTANT FEATURES OF THE INVENTION

It is an aim of the present invention to address the drawbacks of the existing plants of the above mentioned kind and to provide a solution allowing more economic generation of electricity for such a plant.

This aim is achieved in a power generation plant as indicated above in that an auxiliary turbine assembly is positioned at the first location and is connected, with an inlet, to the solar radiation receiver so as to receive said medium stream and, with an outlet, to said conduit so as to discharge said medium stream into said conduit, and in that the auxiliary turbine assembly is coupled to at least one auxiliary power consumer.

The inclusion of an auxiliary turbine assembly being positioned at the first location gives several advantages. The auxiliary turbine assembly is typically a high pressure turbine taking advantages of high pressure and high temperature prevailing down-stream of the solar radiation receiver. Since process gas expands in the high pressure turbine, this means that the medium exiting the auxiliary turbine assembly has lower pressure and lower temperature, which makes transfer to the main turbine assembly less problematic as concerns efficiency losses because of the prevailing pressure and temperature.

The high temperature level in the outlet of the solar radiation receiver can be directly fed-in to an auxiliary turbine assembly which results in high process efficiency.

The auxiliary turbine assembly being a high pressure turbine and the solar radiation receiver as well as the auxiliary power consumer are easily formed to a light, compact unit which easily can be positioned for example at an elevated position, and since the process gas exiting the high pressure turbine has a relatively low temperature it is possible to transfer it down to the main turbine assembly with a minimum of thermal losses. Further, costly materials can be avoided because of the reduced temperature and pressure. It is also possible to provide increased temperatures in the receiver without particular problems which enhances efficiency without having to provide for high temperature transfer between the first and the second location.

In particular it is preferred that process medium is a mix of steam and air because of the advantageous results that are obtainable through such a solution. Steam to be transferred to the solar radiation receiver is particularly obtained by heat exchange, at a suitable position or suitable positions with the process gas stream.

Preferably the auxiliary power consumer is a compressor assembly being an air compressor assembly. Compressed air and high pressure steam are brought to the receiver in order to take up solar energy. The steam can be used to enhance cooling of temperatures sensitive places in the receiver, in particular near a radiation inlet window, as well as in the turbine, in particular in heat exposed turbine blades. It is advantageous to pass at least part of the steam through the turbine for cooling purposes before entry thereof in the solar radiation receiver. A certain portion of the steam can be used for film cooling of exposed elements in the turbine assembly as well as of exposed elements in the solar radiation receiver. Mix of steam and air, as a general rule, increases heat transfer capacity.

Part load efficiency is advantageous on the one hand because steam can be introduced in suitable amounts during part load in order to obtain best efficiency, on the other hand as there is a possibility to vary rotational speed on the auxiliary turbine assembly and associated units for best efficiency. Basically, the thermal process efficiency is based on the difference between the temperature level in the position where heat is taken up by process medium and the temperature level where the heat is delivered. The difference should be as great as possible in order to provide best efficiency, i.e. there is as high a temperature in the receiver exit as possible and as low a temperature as possible downstream of the units wherein energy is extracted from the process medium.

The solar radiation receiver, the auxiliary turbine assembly and the auxiliary power consumer are preferably placed adjacent to the solar radiation receiver which is positioned in a focal area of a solar radiation reflector cluster in order to reduce efficiency losses. It is particularly useful when the solar radiation receiver, the auxiliary turbine assembly and the auxiliary power consumer are positioned at an elevated position in respect of the solar radiation reflector cluster, such as at a top of a tower, with the main turbine assembly being positioned at a lower level.

Particularly preferred according to the invention is that a combustor is positioned downstream of the solar radiation receiver and upstream of the auxiliary turbine assembly. This opens for combined operation of the plant in that, at times, the operation can be completed with combustion energy from a combustible fuel. Hereby an entire plant can be made operational also when there is limited or no solar influx to the plant and that important parts of the plant can be utilized without restriction to when the sun is shining.

The combustor is thus connected in series with the solar radiation receiver in order to efficiently realize the hybridisation of the device. Also the combustor can be constructed as a light weight unit which is extremely suitable for positioning at elevated positions and in order to form a unit together with the solar radiation receiver and the auxiliary turbine assembly. It is to be noted that this aspect of the invention is also important for increasing plant efficiency also under normal conditions of the solar radiation receiver, when the sun is shining as expected. Even under such near ideal conditions, it is likely that a normally functioning solar radiation receiver delivers process medium heated to 1000-1300° C., which is clearly below what would have resulted in best possible cycle efficiency, which in a plant of the intended kind is around 1400-1600° C. in order to match the best inlet parameters of the auxiliary turbine assembly. Taking this into account, it is a great advantage to be able to top up the turbine inlet temperature by firing the combustor. This is advantageously combined with sensing temperatures downstream of the solar radiation receiver and downstream of the combustor and control fuel supply to the combustor accordingly in order to reach the desired temperature level.

It is preferred that the combustor forms a low flow resistance unit having a central axis crossing a central axis of an outlet from the solar radiation receiver and being coaxial with a central axis of the auxiliary turbine assembly.

The plant typically includes a set of distributed solar radiation reflectors which are controlled so as to reflect solar radiation to the solar radiation receiver. Normally this means that the solar radiation receiver is positioned at a considerable height above a ground level.

Advantageously, a steam generator is connected to an outlet from the main turbine assembly so as to extract heat from an outlet flow from said main turbine assembly.

Also advantageously, a condenser is arranged downstream of the steam generator so as to obtain liquid water condensate downstream of the main turbine assembly. Hereby, a liquid water condensate outlet from the condenser is advantageously connected to the steam generator. Water pressure is raised to, as an example, 50-110 bar, by a pump being positioned in a conduit transmitting said water condensate. A conduit is also arranged for transmitting steam from the steam generator to an inlet of the solar radiation receiver, preferably at least partly via cooling channels in the auxiliary turbine assembly. As indicated above, a certain portion of the steam can be used for film cooling of exposed elements in the turbine assembly as well as of exposed elements in the combustor and the solar radiation receiver.

The auxiliary turbine assembly is preferably directly connected to a high pressure compressor unit and/or indirectly, over a speed reducing gear transmission, to a low pressure compressor unit.

Corresponding advantages are obtained through the features relating to a method of operating a power generation plant.

BRIEF DESCRIPTION OF DRAWINGS

The invention will now be described in greater detail at the background of embodiments and with reference to the drawings, wherein.

DESCRIPTION OF EMBODIMENTS

Figure 1:
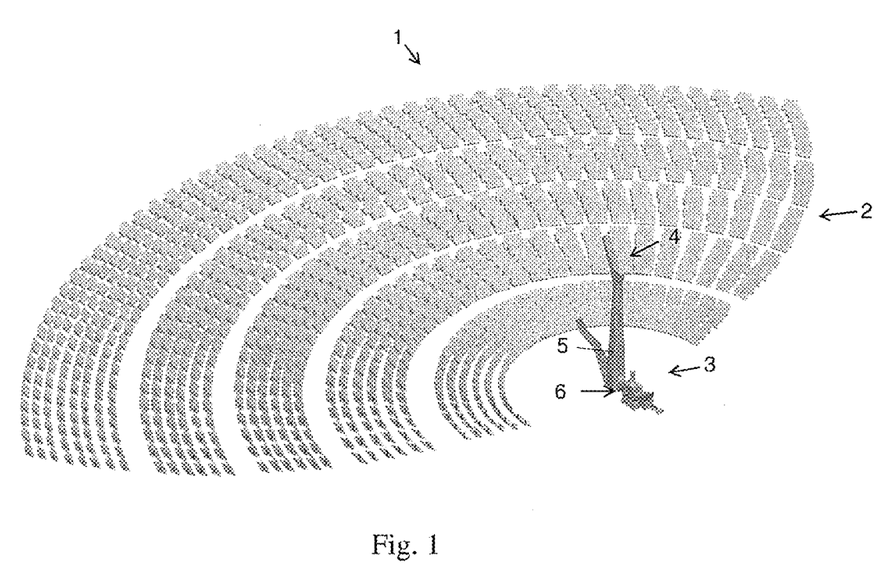
FIG. 1 shows a power generation plant according to the invention.

FIG. 1 shows a power generation plant 1 having a set of distributed reflectors 2 for reflecting solar radiation onto a solar radiation receiver. 3 indicates the active part of the power generation plant which includes a top unit 4 for being an integral unit which includes a solar radiation receiver and an auxiliary turbine assembly having connected to it (an) auxiliary power consumer (-s) such as a compressor assembly and/or an electric power generator. The top unit 4 preferably also includes a combustor for allowing operation of the plant also during times when solar radiation energy is to be topped-up, is low or does not exist. The top unit 4 is positioned at the top of a tower 5 which includes conduits for transmitting process medium between the top unit 4 and a ground unit 6, which in turn includes a main turbine assembly and an electric power generator. The ground unit 6 further includes a steam generator and a water recovery condenser. The elements of the top and ground units are not shown.

Figure 2:
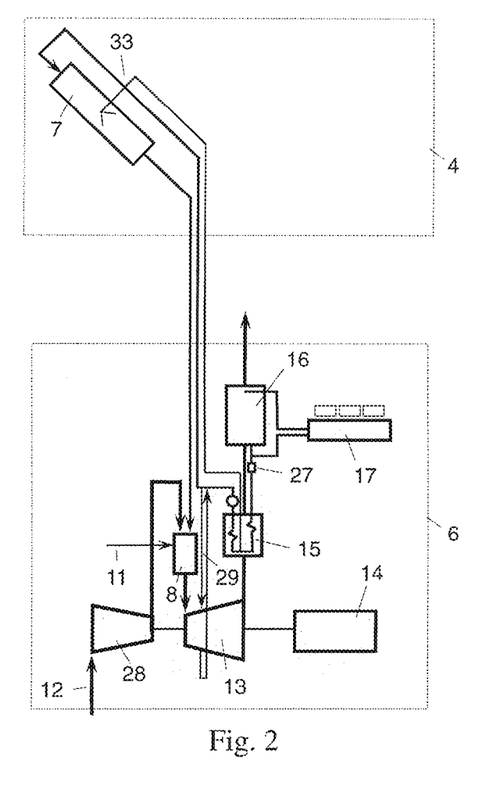
FIG. 2 shows diagrammatically the layout of a first embodiment of a power generation plant.

FIG. 2 shows in more detail a first embodiment of the invention, wherein, in the top unit 4, there is illustrated a solar radiation receiver 7 which has a steam inlet and an air inlet, said air inlet providing compressed air from an air compressor assembly 10, which in turn is driven by an auxiliary turbine assembly 9 having an inlet being connected to an outlet of the solar radiation receiver 7. Between the solar radiation receiver 7 and the auxiliary turbine assembly 9 there is positioned a combustor 8 for providing combustion energy to the process to an extent to be determined by a CPU unit (not shown) being included in the plant, said combustor having a fuel inlet 11. Fuel to be used in the combustor can be gasified biological fuel or any other suitable fuel. Air from air compressors constitutes combustion air for the combustor 8.

Process medium exiting the auxiliary turbine assembly 9 and thus having reduced pressure and temperature is led down to the ground unit 6, wherein it is received at the inlet of a main turbine assembly 13 which in turn drives an electrical power generator 14 for the production of electrical energy. Process medium exiting the main turbine assembly 13 is led to a steam generator 15 for the production of steam to be delivered to the top unit 4 for introduction into the solar radiation receiver 7. Downstream of the steam generator 15 the process medium is led to a water recovery condenser 16 which in turn is connected to air cooler 17 and is also connected to the steam generator 15 for supplying the same with feed water for the steam production. Water pressure is raised to a desired level by means of a pump 27 being positioned between the water recovery condenser 16 and the steam generator 15. 29 indicates a conduit for transmitting part of the steam from the steam generator 15 to/through the turbine for cooling purposes. See above in respect of the cooling issue.

In the embodiment of FIG. 2, the air compressor assembly 10 is shown having an air inlet emanating from a main compressor unit 28 which is also driven by the main turbine assembly. The main compressor unit 28 in turn has an air inlet 12.

Besides driving the air compressor assembly 10, the auxiliary assembly 9 is in this case also connected to an auxiliary power generator 18 for the production, to a certain extent, of electrical energy. It could be mentioned that it is beneficial in general that much work is performed by the auxiliary turbine assembly in order that the temperature and pressure in the conduit to the ground unit is kept relatively low, bearing in mind the problems of heavy equipment at elevated positions as is discussed above.

Figure 3:
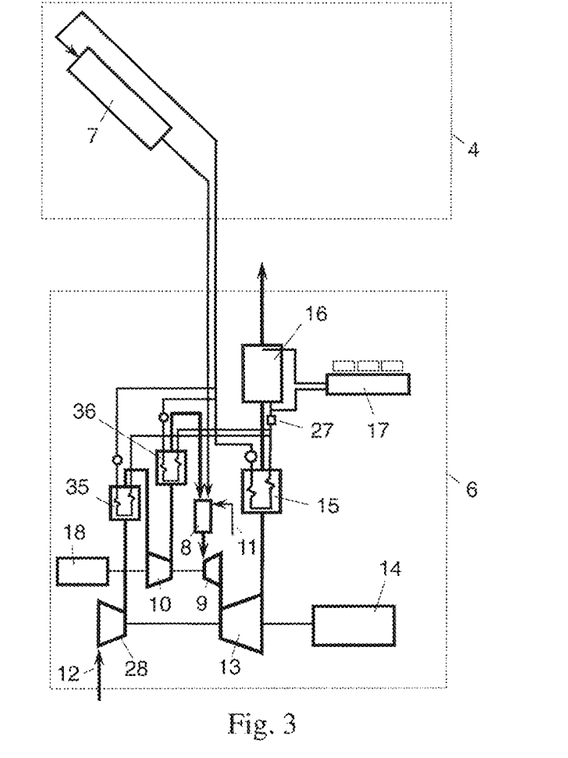
FIG. 3 shows a second embodiment of an inventive power generation plant.

The plant in FIG. 3 i.e. differs from the one in FIG. 2 in that the air compressor assembly 10 is shown having a direct air inlet 12 and being comprised of a two step compressor. There is also provided a gear box 30 for reducing the high rotational speed from the auxiliary turbine assembly 9 into a lower rotational speed so as to better adapt to the function of a suitable air compressor assembly. Further, consequently, no auxiliary power generator 18 is included in this embodiment.

In steam cycles (Rankine cycles) in general according to the present application, process medium goes from liquid water to superheated steam during the heat-up process. For solar receivers it is preferred if the medium flow phase is the same along the extension of the receiver during the heat-up process. This is advantageous compared to the background art, where the solar radiation receiver has to be designed to manage heating and boiling water as well as superheating steam.

According to the embodiment in FIG. 3, water is produced in the steam/water generator 15. From here it can easily be injected and transformed to steam when mixed with hot air. Some water injection prior to the receiver is an advantage as long as the injected water evaporates such that only water in steam form reaches the receiver 7. The water can be injected in the compressor flow between the two compressor steps in a first spraying station 31 and/or at the exit of the compressor assembly in a second spraying station 32. For the compressor operation, this is beneficial in that lower compressor work will be needed.

As an alternative, a steam generator (not shown) can be arranged to heat exchange with the compressor flow between compressor steps and/or in the compressor exit flow. Steam generated this way is then advantageously passed into the steam conduit leading to the solar radiation receiver.

Figure 4:
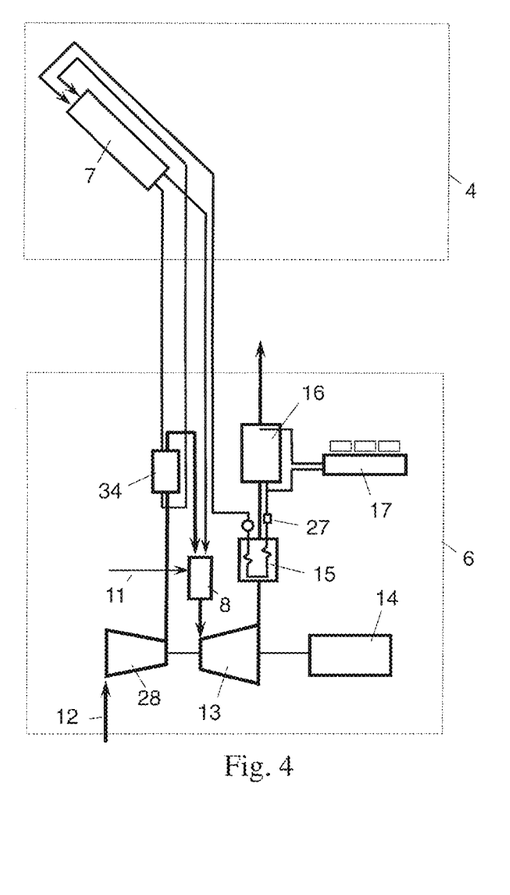
FIG. 4 shows a third embodiment of an inventive power generation plant.

The plant in FIG. 4 differs from the one in FIG. 2 in that it is advantageously complemented with a reheater combustor 8' being positioned near and upstream of the main turbine assembly in order to enhance the operational conditions for said main turbine assembly and thereby give the possibility to enhance efficiency of the entire plant. It is not excluded that the temperature is raised by the reheater combustor as high as to 1400° C. or even higher.

This arrangement makes it necessary to provide dual steam pressure, on the one hand high pressure, as an example 55-110 bar to be delivered to the solar radiation receiver, and on the other hand low pressure, as an example 20-40 bar to be delivered to the reheater combustor 8'. The pump arrangement 27 in FIG. 4 is thus constructed for delivering steam in chosen amounts at chosen pressures to said destinations.

This solution makes it possible to reduce temperature top-up requirement for the auxiliary turbine assembly to as an example 1100-1200° C., which means that the solar radiation receiver exit temperature without any top-up more often is sufficient for the operation.

In this embodiment, further, the turbine assembly 9 as well as the air compressor assembly 10 are both divided into two separate first and second units. Hereby a first turbine unit is connected to a first compressor unit, being a high pressure compressor unit, over a first axis and a second turbine unit, being downstream of the first turbine unit, is connected to a second compressor unit, being a low pressure compressor unit, over a second axis. In the embodiment shown in FIG. 4, the first turbine unit and the first compressor unit are most distant from each other and are interconnected with said first axis, whereas the second turbine unit and the second compressor unit are closest to each other and are interconnected with said second axis being a hollow axis and being coaxial with the first axis and surrounding the first axis.

Air from the compressor, for example after the first compressor unit, is advantageously delivered to the reheater combustor 8'. As an alternative, a compressor unit (not shown) corresponding to main compressor unit 28 in FIG. 2 which is driven by the main turbine assembly 13 may be used to supply air to the reheater combustor 8'.

Figure 5:
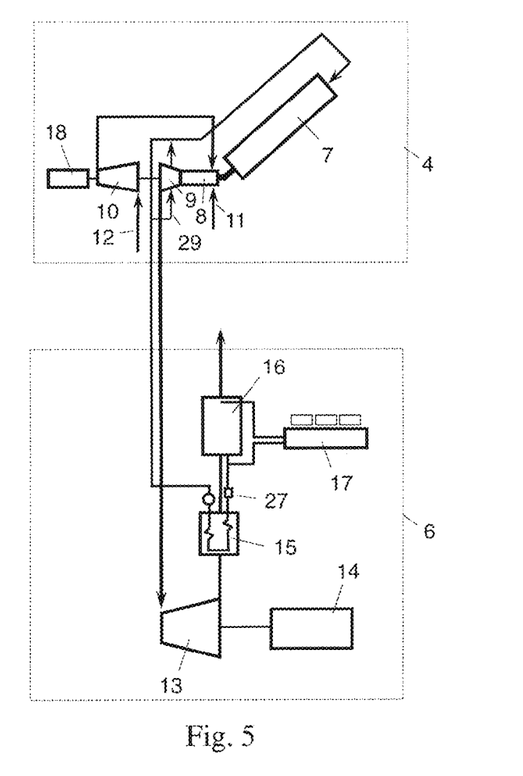
FIG. 5 shows a fourth embodiment of an inventive power generation plant.

The embodiment in FIG. 5 differs from the embodiment in FIG. 2 in that it works with steam alone and that the solar radiation receiver 7 exit thus is directly connected to the auxiliary turbine assembly 9, which in this case is connected to an auxiliary power generator 18 for the production of electrical energy.

Similar to the embodiment in FIG. 2, process medium exiting the auxiliary turbine assembly 9 having reduced temperature and pressure is led to the inlet of the main turbine assembly 13, which in this case is a pure steam turbine, since, as mentioned above, the process medium is steam alone. The steam generator 15 is used for producing high pressure steam. 27 is a feed water pump delivering water at high pressure to the steam generator 15.

19 indicates a steam condenser which virtually recovers all steam as water condensate, and delivers feed water to the steam generator 15. This way a virtually closed water-steam circuit is created.

Figure 6:
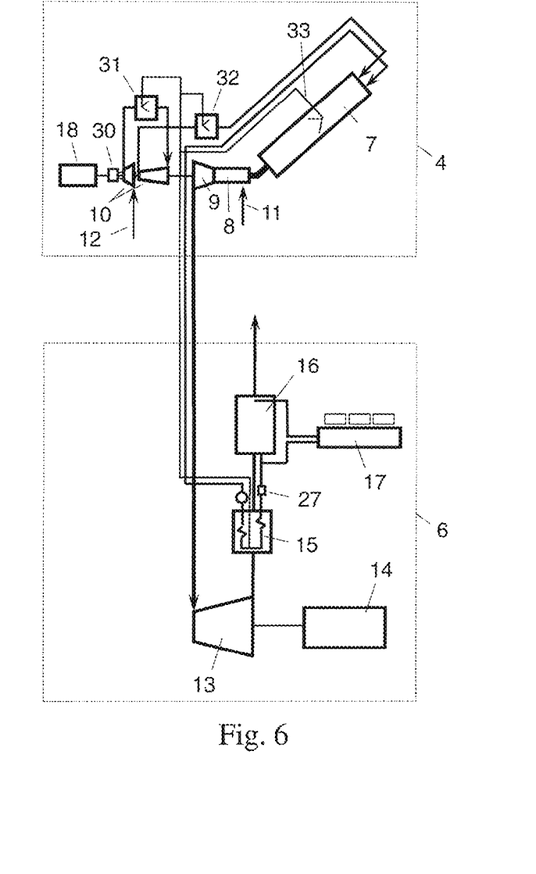
FIG. 6 shows a layout of a solar radiation power generation plant according to the background art.

The background art example shown in FIG. 6 differs from the inventive plant in several aspects. A solar radiation receiver 7 is designed to receive feed water directly which makes it necessary to design it for heating and boiling water as well as for heating steam. Heated steam exiting the solar radiation receiver 7 has to be transferred, often in long conduits, in a state where it is as hot as possible and at as high pressure as possible resulting in unnecessary thermal losses and reduced efficiency.

Figure 7:
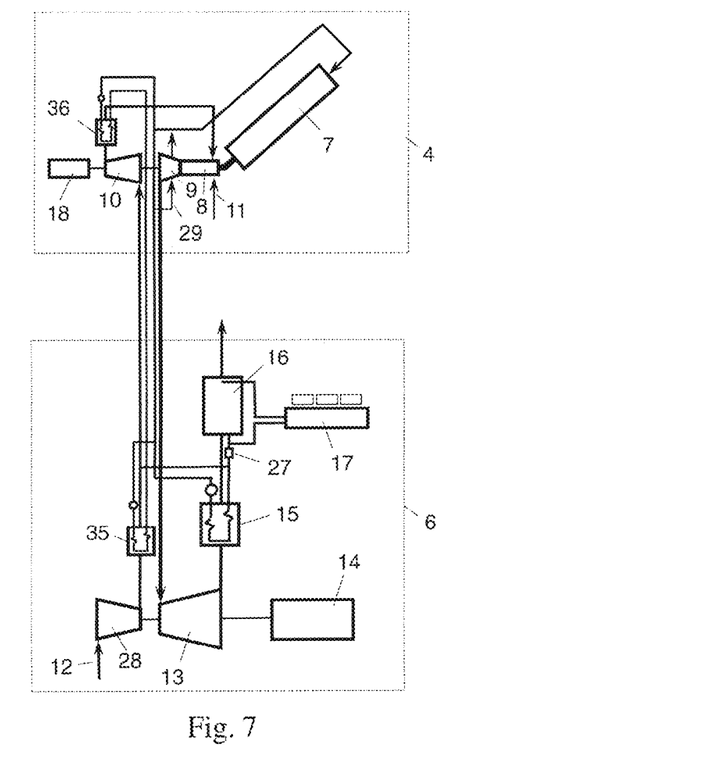
FIG. 7 is a flow chart of a method according to the invention.
Figure 8:
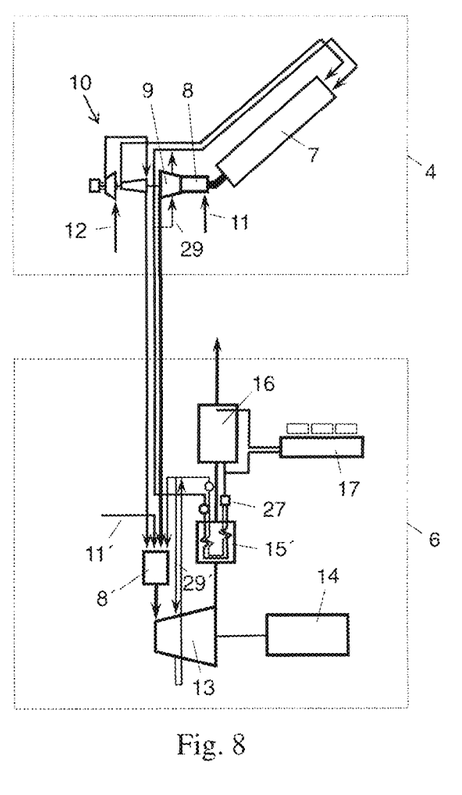
Figure 9:
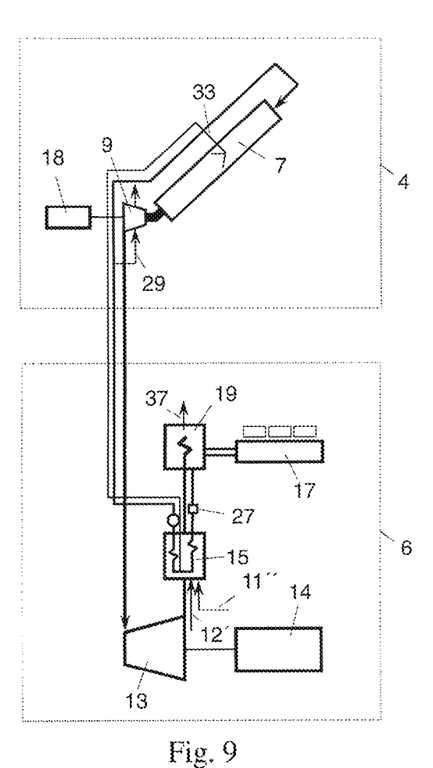
Figure 10:
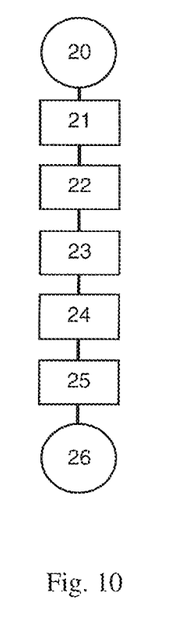

FIG. 7 shows diagrammatically a method sequence according to the invention, wherein position 20 indicates the start of the sequence.

Position 21 indicates heating a medium stream in a solar radiation receiver and passing the heating medium stream to an auxiliary turbine assembly.

Position 22 indicates expanding the medium stream in the auxiliary turbine assembly and passing the expanded medium to a main turbine assembly.

Position 23 indicates expanding the medium stream further in the main turbine assembly.

Position 24 indicates passing the medium stream from the main turbine assembly to a steam generator for recovering energy downstream of the main turbine assembly and passing the so generated steam act to the solar radiation receiver.

Position 25 indicates passing-on process medium exiting the steam generator to a water recovery condenser for the production of feed water to the steam generator.

Position 26 indicates the end of the sequence.

The sequence is advantageously complemented with providing combustion energy, as is discussed above, and the invention can be further modified within the scope of the annexed claims.

The invention claimed is:

1. Power generation plant including a solar radiation receiver for heating a medium stream and a turbine assembly having an inlet arranged to receive said medium stream from an outlet of the solar radiation receiver when heated thereby, said turbine assembly being coupled to an electric power generator, wherein:
    a combustor is positioned downstream of the solar radiation receiver and upstream of the turbine assembly, said combustor being connected in series with the solar radiation receiver so as to receive said medium stream;
    an air compressor unit having a compressed air outlet is arranged to supply compressed combustion air to the combustor; and
    a steam generator is arranged to extract heat from an outlet flow of said medium stream from the turbine assembly, and to produce steam to be transmitted to a medium stream inlet of the solar radiation receiver and subsequently to the combustor,
    wherein a condenser is arranged downstream of the steam generator,
    wherein means are arranged to transfer liquid water obtained by the condenser to the steam generator and/or to the solar radiation receiver, and
    wherein an auxiliary turbine unit is arranged in said medium stream downstream of the solar radiation receiver and upstream of said turbine assembly, said auxiliary turbine unit being coupled to an auxiliary power consumer.

2. Plant according to claim 1, wherein the solar radiation receiver is arranged to be positioned at a first location and the turbine assembly is arranged to be positioned at a second location, at a distance from the first location.

3. Plant according to claim 1, wherein the condenser is arranged downstream of the steam generator, and said means are arranged to transfer liquid water obtained by the condenser to one or more from the group: a circuit of the air compressor unit, the compressed air outlet of the air compressor unit.

4. Plant according to claim 1, wherein the auxiliary turbine unit is drivingly connected to the air compressor unit and/or an auxiliary electric generator.

5. Plant according to claim 4, wherein the auxiliary turbine unit, the air compressor unit and, at occasions, the auxiliary electric generator is/are placed in a first position adjacent to the solar radiation receiver.

6. Plant according to claim 1, wherein each one of the turbine assembly and the auxiliary turbine unit drives a compressor unit and/or an electric generator.

7. Plant according to claim 1, wherein a reheater combustor is positioned upstream of the turbine assembly, downstream of the auxiliary turbine unit.

8. Plant according to claim 1, wherein means are arranged for heat transfer purposes to inlet the compressed air, upstream of the combustor, to a secondary circuit of a heat exchanger having at least one primary circuit being connected for heat transfer from the solar radiation receiver, said at least one primary circuit after exit from the heat exchanger leading back to the solar radiation receiver.

9. Plant according to claim 1, wherein it includes auxiliary steam generation means recovering heat from any one of: an intercooler circuit of the air compressor unit, the compressed air outlet of the air compressor unit; wherein means are arranged to transfer generated steam to the solar radiation receiver.

10. Plant according to claim 1, wherein mixing means are arranged for mixing compressed air to be heated in the solar radiation receiver with steam so as to form said medium stream.

11. Plant according to claim 1, wherein a control unit is arranged to regulate the operation of the air compressor unit in respect of compressed combustion air production as a response to operation of the combustor.

12. Method of operating a power generation plant including heating a medium stream in a solar radiation receiver and passing the heated medium stream from an outlet of the solar radiation receiver to an inlet of a turbine assembly, wherein electric power is extracted from said turbine assembly by an electric power generator, and wherein:
    said medium stream downstream of the solar radiation receiver and upstream of the turbine assembly is heated in a combustor, said combustor being connected in series with the solar radiation receiver so as to receive said medium stream,
    compressed combustion air is produced in an air compressor unit and supplied to the combustor, and
    heat is extracted from an outlet flow from the turbine assembly by a steam generator and produced steam is transmitted to an inlet of the solar radiation receiver and subsequently to the combustor,
    wherein condensation is effected downstream of the steam generator, and liquid water obtained by the condensor is transferred to the steam generator and/or the solar radiation receiver, and
    wherein the medium stream downstream of the solar radiation receiver and upstream of said turbine assembly is expanded in an auxiliary turbine unit which is being coupled to an auxiliary power consumer.

13. Method according to claim 12, wherein the solar radiation receiver is positioned at a first location and the turbine assembly is positioned at a second location, at a distance from the first location.

14. Method according to claim 12, wherein condensation is effected downstream of the steam generator, and liquid water obtained by the condenser is transferred to one or more from the group: a circuit of the air compressor unit, the compressed air outlet of the air compressor unit.

15. Method according to claim 12, wherein the auxiliary turbine unit drives the air compressor unit and/or an auxiliary electric generator.

16. Method according to claim 12, wherein a compressor unit and/or an electric generator is driven by each one of the turbine assembly and the auxiliary turbine unit.

17. Method according to claim 12, wherein the medium stream upstream of the turbine assembly and downstream of the auxiliary turbine unit is reheated in a reheater combustor.

18. Method according to claim 12, wherein upstream of the combustor, the compressed air is heat exchanged with at least one closed branch stream from the solar radiation receiver.

19. Method according to claim 12, wherein auxiliary steam is generated by recovering heat from one or more of: a circuit of the air compressor unit, the compressed air outlet of the air compressor unit; wherein means are arranged to transfer generated steam to the solar radiation receiver.

20. Method according to claim 12, wherein compressed air to be heated in the solar radiation receiver is mixed with steam so as to form said medium stream.

21. Method according to claim 12, wherein the operation of the air compressor unit is regulated in respect of compressed combustion air production as a response to operation of the combustor.

22. Power generation plant including a solar radiation receiver for heating a medium stream and a turbine assembly having an inlet arranged to receive said medium stream from an outlet of the solar radiation receiver when heated thereby, said turbine assembly being coupled to an electric power generator, wherein:
 a steam generator is connected to an outlet from the turbine assembly so as to extract heat from an outlet flow of said medium stream from the turbine assembly for steam production; and
 a steam outlet from the steam generator is connected to a medium stream inlet of the solar radiation receiver for leading produced steam into the solar radiation receiver, and
 wherein a condenser is arranged downstream of the steam generator as seen in the medium stream,
 wherein means are arranged to transfer liquid water obtained by the condenser to the steam generator and/or to the solar radiation receiver, and
 wherein an auxiliary turbine unit is arranged in said medium stream downstream of the solar radiation receiver and upstream of said turbine assembly, said auxiliary turbine unit being coupled to an auxiliary power consumer.

23. Plant according to claim 22, wherein at least one water conduit leads to the solar radiation receiver for supply of liquid water to be sprayed into the solar radiation receiver.

24. Plant according to claim 22, wherein the steam generator includes a fuel burner device for providing an auxiliary steam generation heat source.

25. Plant according to claim 22, wherein the auxiliary turbine unit is coupled to an auxiliary electric generator.

26. Plant according to claim 25, wherein the solar radiation receiver, the auxiliary turbine unit and the auxiliary electric generator are included in an integrated unit.

27. Plant according to claim 25, wherein the auxiliary turbine unit is connected directly to the solar radiation receiver.

28. Plant according to claim 25, wherein a liquid water condensate outlet from the condenser is connected to the steam generator.

29. Plant according to claim 22, wherein it is arranged that at least part of said steam to the solar radiation receiver, is used for cooling of parts of the auxiliary turbine unit.

30. Plant according to claim 22, wherein the solar radiation receiver is positioned in a focal area of a solar radiation reflector cluster that includes a set of distributed solar radiation reflectors which are controlled so as to reflect solar radiation to the solar radiation receiver.

31. Plant according to claim 22, wherein the solar radiation receiver, and at occasions the auxiliary turbine unit, is arranged to be positioned at a first location and the turbine assembly is arranged to be positioned at a second location, at a distance from the first location.

32. Plant according to claim 31, wherein the first position is elevated in respect of the solar radiation reflector cluster, such as at a top region of a tower, with the turbine assembly being positioned at a lower level.

33. Method for operating a power generation plant including heating a medium stream in a solar radiation receiver and passing said medium stream when heated from an outlet of the solar radiation receiver to an inlet of a turbine assembly and expanding the heated medium stream in the turbine assembly, wherein energy is extracted from said turbine assembly by an electric power generator, wherein:
 heat is extracted for steam production from an outlet flow of said medium stream from the turbine assembly by a steam generator; and
 produced steam is passed from a steam outlet from the steam generator to an inlet of said medium stream of the solar radiation receiver,
 wherein condensation is effected downstream of the steam generator, and liquid water obtained by the condenser is transferred to the steam generator and/or the solar radiation receiver, and
 wherein the medium stream downstream of the solar radiation receiver and upstream of said turbine assembly is expanded in an auxiliary turbine unit which is being coupled to an auxiliary power consumer.

34. Method according to claim 33, wherein liquid water is supplied for spraying into the receiver.

35. Method according to claim 33, wherein auxiliary heat for steam generation is provided by a fuel burner device in the steam generator.

36. Method according to claim 33, wherein at least part of said steam to the solar radiation receiver is used for cooling of parts of the auxiliary turbine unit.

\* \* \* \* \*